No. 608,082. Patented July 26, 1898.
T. B. SLOPER.
BICYCLE BRAKE.
(Application filed Sept. 26, 1896.)
(No Model.) 2 Sheets—Sheet 1.

No. 608,082. Patented July 26, 1898.
T. B. SLOPER.
BICYCLE BRAKE.
(Application filed Sept. 26, 1896.)

(No Model.) 2 Sheets—Sheet 2.

Witnesses.
Thomas Durant.
Wallace Murdoch.

Inventor.
Thomas B. Sloper,
by Church & Church
his Attys.

UNITED STATES PATENT OFFICE.

THOMAS BEAVAN SLOPER, OF DEVIZES, ENGLAND.

BICYCLE-BRAKE.

SPECIFICATION forming part of Letters Patent No. 608,082, dated July 26, 1898.

Application filed September 26, 1896. Serial No. 607,102. (No model.) Patented in England December 3, 1891, No. 21,097.

*To all whom it may concern:*

Be it known that I, THOMAS BEAVAN SLOPER, a subject of the Queen of England, residing at Devizes, county of Wilts, England, have invented certain new and useful Improvements in Brakes for Cycles and other Vehicles, (for which I have obtained Letters Patent in Great Britain, No. 21,097, dated December 3, 1891,) of which the following is a specification.

This invention relates to an improved form of brake specially adapted for use with pneumatic or rubber tires. Instead of the usual plunger-brakes or band-brakes working on metallic drums I employ a "mud-guard" brake.

The invention will be best understood with the aid of the accompanying drawings, in which it is illustrated with reference to its application to a cycle.

Figure 1:
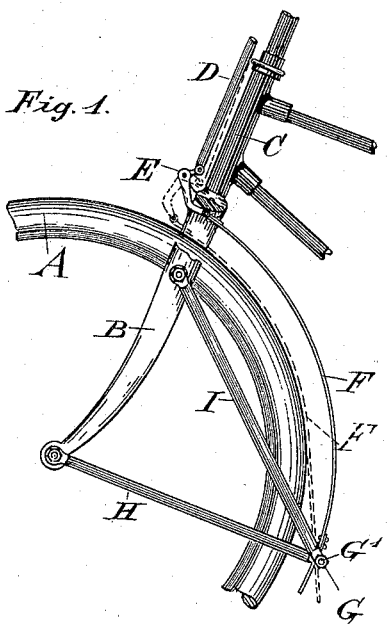
Figure 2:
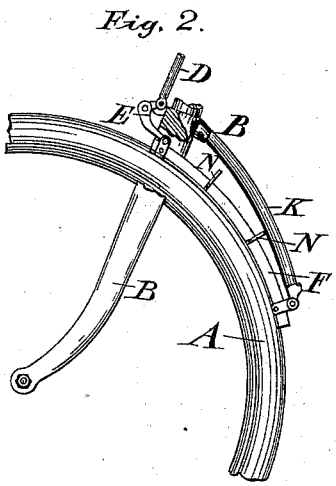
Figure 5:
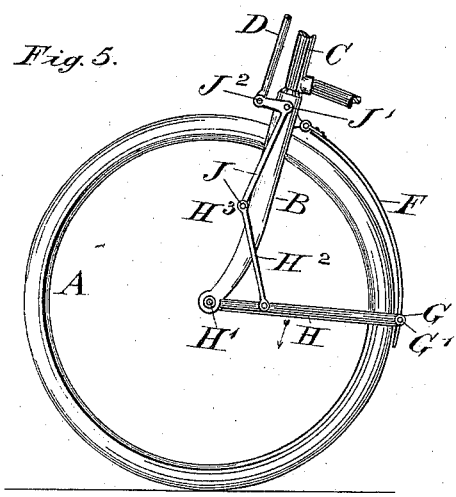
Figure 8:
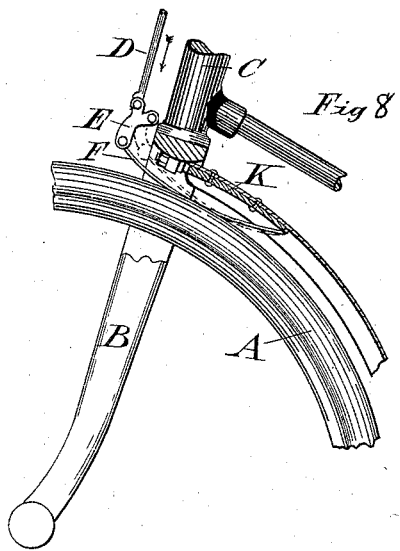
Figure 3:
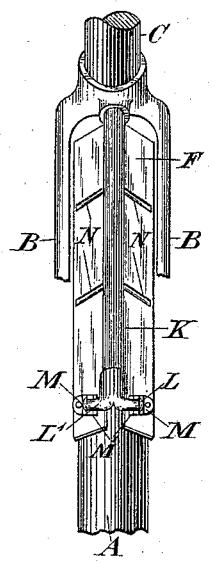
Figure 6:
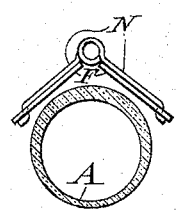
Figure 7:
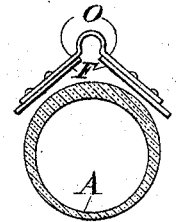

Figure 1 is a side elevation of a portion of a cycle with the mud-guard brake attached. Fig. 2 is also a side elevation showing a modified form of brake. Fig. 3 is a back, and Fig. 4 a front, view of the brake shown in Fig. 2. Fig. 5 is a modified arrangement of brake. Figs. 6 and 7 are transverse sections of details. Fig. 8 is a view, partly in side elevation and partly in section, showing a modification.

Like letters indicate like parts throughout the drawings.

A is the tire, B the fork, C the frame-head, all of the ordinary construction.

D is the brake-rod, preferably operated from the handle-bar, its lower end being jointed to the shorter arm of the bell-crank or angle lever E, to the longer arm of which the brake F is jointed. This brake F may consist of a flat strip or band of flexible material, preferably metal, and may be curved to a radius sufficiently exceeding that of the wheel. The other end of the brake strip or band may be secured at the point G to the extremities of the stays H I. The brake-band is so arranged near the circumference of the wheel that it is clear of the tire when in its normal or inoperative position; but when the bell-crank lever is operated it will assume the position shown in dotted lines, Fig. 1—that is, it will be brought into contact with the tire and act as a brake. Stays H, branching from the axle, and stays I, branching from the upper part of the fork B, meet the lower end of the brake-band at G, and the whole are secured together by the bolt G'.

In the arrangement described above the band is tightened from the upper end, but if desired the tightening may be effected from the lower end or from both ends at once.

A simple arrangement for tightening from the bottom is shown in Fig. 5, in which it will be seen that the stay H is made to act as a lever by having jointed to it at H' the link H², which at H³ is jointed to the angle-lever J, pivoted at J' to the fork and at J² to the brake-rod D.

The lever H when pushed down will turn about the wheel-center in the direction of the arrow and will carry with it the brake-band, thereby pulling it onto the wheel.

One of the great advantages of this form of brake is that a large surface of tire is acted upon at the same time, thus giving more braking effect with less tendency to wear the treading-surface.

Figure 4:
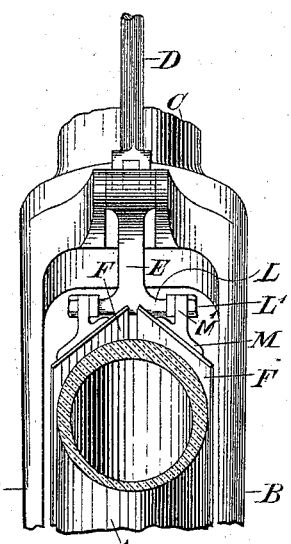

Instead of applying the band-brake on the wearing-surface of the tire it may, if desired, be applied to the sides or edges, in which case it will be necessary to form the brake in two or more parts. This arrangement is shown in Figs. 2, 3, and 4, in which F are the two brake-bands, preferably set at any angle to each other, and they are carried by a central stay K, secured at one end to the upper part of the fork B. The lower end of this rod K may be spread out to form arms L, as shown in Fig. 3.

To the brake-bands F are riveted or otherwise secured lugs M M', the portions M' of which are fitted loosely on the arms L, whereon they are secured by nuts L' or equivalent means. The front ends of the brake-bands F are connected to the lever E in a manner similar to that in which the back ends are connected to the stay K.

Figs. 6 and 7 are transverse sections showing in the one case a wire spring N and in the other a flat spring O, to either of which the angle brake-bands F are secured. These springs connect the two bands together and they allow of sufficient play to admit of their movement in a forward direction.

In the place of a plain steel band for the mud-guard brake a steel band lined with leather inside may be used to increase the friction.

The brake-band may be used together with the ordinary mud-guard, in which case the bands may retire into the hollow of the guard when not in use, and if desired the brake band or bands may be comparatively short and may be curved the opposite way to the guard. This arrangement is illustrated in Fig. 8, in which the band F is almost straight and retires more or less into the hollow of the ordinary mud-guard when not in use; but when the lever E is operated the band takes a more rounded form until the outer part thereof comes in contact with the tire and so acts as a brake.

Two or more bands may be used in a manner similar to that illustrated in Fig. 2, and if desired the mud-guard may be dispensed with altogether.

The bands may be jointed at a central or any other position in order to allow greater freedom when two or more bands are used together.

Obviously any ordinary or preferred means may be employed for returning the brake-operating mechanism to normal position after operation, and any of the ordinary or preferred operating mechanisms may be employed in connection with the present form of brake.

It is obvious that the arrangement of the various parts of this mud-guard brake may be considerably modified without departing from the spirit of this invention.

In the claims where it is stated that the ends of the brake-band are movable with relation to each other it is to be understood that such movement is a relative one—that is to say, that either one or both of the ends of the band may be moved with relation to the other.

I claim—

1. The combination with the ground-wheel of a vehicle, of a flexible brake-band supported in proximity to the periphery of the wheel above its point of contact with the ground, the ends of the flexible brake-band being movable with relation to each other longitudinally to the band, whereby the flexure of the band is varied to throw its central portion into or out of contact with the periphery of the wheel, and brake-operating mechanism, substantially as described.

2. The combination with the ground-wheel of a vehicle and a brake-operating mechanism, of brake-supports movable toward and from each other in proximity to the periphery of the wheel and a flexible brake-band having its opposite ends secured to said supports, whereby the intermediate portion of the brake may be thrown into or out of contact with the periphery of the wheel at a point above the ground-level substantially as described.

3. The combination with the ground-wheel of a vehicle, of a substantially rigid stay connected to the frame and extending back over the wheel, a flexible band held at one end by the said stay, and mechanism for moving the opposite end with relation thereto whereby the intermediate portion of the band may be thrown into or out of contact with the periphery of the wheel; substantially as described.

4. The combination with the ground-wheel of a vehicle having a tire substantially semicircular in cross-section, of a brake consisting of two plates set at an angle to each other, the springs uniting said plates and means for forcing said plates into contact with the tire; substantially as described.

5. The combination with the ground-wheel of a vehicle having a tire substantially semicircular in cross-section, of the flexible bands set at an angle to each other and connected by springs, one end of said bands being connected to the frame of the vehicle, and means for moving the ends of the bands with relation to each other longitudinally of the band, whereby the intermediate portion of the bands may be brought into and out of contact with the tire of the wheel; substantially as described.

6. The combination with the ground-wheel of a vehicle having a tire semicircular in cross-section of a substantially rigid stay connected to the frame of the vehicle and extending back over the wheel, of two flexible bands connected at one end to said stay, and mechanism for moving the ends of the band with relation to each other longitudinally of the bands, whereby the intermediate portion of the bands may be brought into and out of contact with the wheel; substantially as described.

In witness whereof I have hereto set my hand in the presence of the two subscribing witnesses.

THOMAS BEAVAN SLOPER.

Witnesses:
ALFRED J. BRUTT,
HARRY B. BRIDGE.